Figure 1:
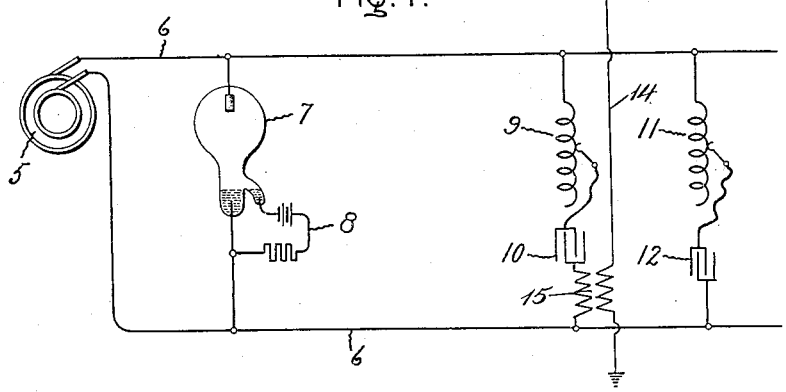

E. F. W. ALEXANDERSON.
METHOD OF FREQUENCY TRANSFORMATION.
APPLICATION FILED JULY 29, 1913.

1,174,793.

Patented Mar. 7, 1916.

WITNESSES:
J. Earl Ryan
J. Ellis Glen

INVENTOR:
ERNST F. W. ALEXANDERSON,
BY A. M. Davis
HIS ATTORNEY.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

METHOD OF FREQUENCY TRANSFORMATION.

1,174,793. Specification of Letters Patent. Patented Mar. 7, 1916.

Application filed July 29, 1913. Serial No. 781,782.

*To all whom it may concern:*

Be it known that I, ERNST F. W. ALEXANDERSON, a citizen of the United States, residing at Schenectady, in the county of Schenectady, State of New York, have invented certain new and useful Improvements in Methods of Frequency Transformation, of which the following is a specification.

My invention relates to the transformation of an alternating current of a given frequency into an alternating current of a different frequency.

The object of my invention is to provide a novel and improved method for the transformation of the frequency of an alternating current.

More particularly the object of my invention is to provide a new and improved method of and means for obtaining the second, third, and higher harmonics of the fundamental frequency of an alternating current.

In certain modern developments of the use of electro-radiant energy for signaling, as for example in wireless telephony, frequencies considerably in excess of the highest frequencies that can be practically produced by a high frequency alternator are desirable. An efficient and practical method of frequency transformation whereby an alternating current of 200,000 cycles can be transformed into an alternating current of the second, third or higher harmonic frequency is accordingly greatly to be desired. I have discovered that the wave form of an alternating current of high frequency, for example 100,000 to 200,000 cycles, can be so distorted by the use of an electric current valve of rarefied gas such as a mercury vapor electric current rectifier as a load on the circuit, that well defined alternating currents of the second, and third, and even higher harmonics of the fundamental frequency can be segregated in circuits tuned for the frequency of the respective harmonics.

In carrying out my invention I use an electric current valve of rarefied gas in which an arc is formed by the passage of the current. Mercury vapor serves as an example of a gas that may be used in such an electric current valve. I have discovered that the distortion of an electric current wave by the arc in a rarefied gas valve is such that well defined harmonics of the fundamental frequency are produced. I have also discovered that certain harmonics can be accentuated if the rarefied gas valve is adapted to break down at a predetermined voltage. My present method of obtaining higher harmonics of a fundamental frequency does not depend upon the simple suppression of half cycles, but rather upon the distortion of the whole wave by an electric current valve of rarefied gas whereby alternating currents of frequencies harmonic to the fundamental frequency are produced.

Figure 2:
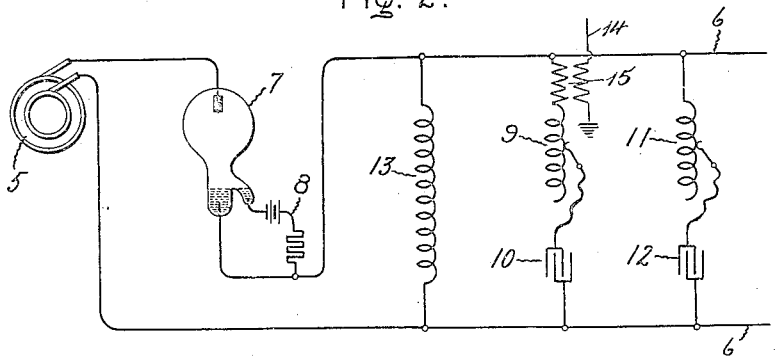

The features of my invention which I believe to be patentably novel are definitely indicated in the claims appended hereto. The method of frequency transformation which I have invented and the operation of a system of apparatus for carrying out this method will be understood from the following description taken in connection with the accompanying drawings, in which:

Figure 1 is a diagrammatic representation of an arrangement of electrical apparatus for carrying out my invention, and Fig. 2 is a modified arrangement of such apparatus.

In the drawings I have diagrammatically represented a high frequency single phase alternator 5 arranged to supply alternating current to the conductors 6 of an electric circuit. In Fig. 1 I have shown an electric current valve of rarefied gas such as a single phase half wave mercury vapor rectifier or uni-directional electric current valve connected as a load on the alternator 5. The rectifier is provided with the usual starting circuit 8. Connected in parallel with the rectifier 7 and between the conductors 6 are two auxiliary working circuits containing adjustable inductance and capacity. The inductance 9 and capacity 10 of one of these circuits is so adjusted that the circuit is tuned for the current of the second harmonic of the fundamental frequency of the current generated by the alternator 5. The inductance 11 and capacity 12 of the second circuit are adjusted to tune this circuit for current of the third harmonic frequency. It will, of course, be understood that any desired translating device for the consumption of energy of the alternating current of the second or third harmonic frequency may be included in the working circuits tuned for the currents of these respective frequencies. In the accompanying drawings I have illustrated by way of example an antenna 14 electrically connected in the working circuit through a transformer 15 for utilizing the alternating current of the desired harmonic frequency.

In Fig. 2 of the drawings I have shown the half wave current rectifier 7 connected in series with one conductor of the circuit. An inductive winding 13 is connected between the conductors 6 to provide a closed circuit for the flow of current of the fundamental frequency. The inductance of the winding 13 is such that it offers a high impedance to currents of the second and higher harmonic frequencies, and accordingly currents of these latter frequencies will not pass through the inductive winding 13.

The operation of the systems shown in the drawing is as follows: The single phase half wave current rectifier 7 constitutes a load upon the high frequency alternator 5. As shown in the drawings, the current rectifier may be included in series or in shunt relation with the working electric circuit. The effect of the current rectifier is to distort the wave form produced by the alternator and this distortion of the wave form results in the production in the electric circuit of currents of the second and third and higher harmonics of the fundamental frequency. The auxiliary working circuits containing the adjustable inductance and capacity are tuned for the respective harmonics desired and in this manner the desired harmonics can be segregated in a particular working circuit.

The production of the currents of the second, third, and higher harmonics by distorting the wave form of the current of fundamental frequency will be understood by considering that a distorted wave form may be resolved into a plurality of component wave forms. These component wave forms will be of all harmonic frequencies, and thus a practically endless series of higher harmonic wave forms can be obtained from the distorted wave form of the fundamental frequency. Certain harmonics may be accentuated by proper consideration of the characteristic of the distortion produced in the wave form of fundamental frequency. The current rectifier may if desired be designed to break down at a predetermined voltage. By so designing the rectifier a greater and more varied distortion of the fundamental wave form may be obtained, and certain desired harmonic frequencies may be thus accentuated.

It will be understood that while I have shown only two auxiliary working circuits for segregating the currents of the second and third harmonics that any number of such working circuits may be employed, and any desired harmonic may be obtained by tuning the working circuit for such harmonic. It will further be understood that I do not desire to limit my invention to the use of a mercury vapor rectifier, since my method of frequency transformation can be carried out with any electric current valve of rarefied gas which distorts the wave form of an alternator when connected thereto as a load.

What I claim as new and desire to secure by Letters Patent of the United States is:

1. The method of increasing the frequency of an alternating current which consists in subjecting the current to the effects of an electric current valve of rarefied gas, producing thereby a distortion of the wave form, and segregating in a suitably tuned electric circuit the resulting alternating current of the desired increased frequency.

2. The method of obtaining an alternating current of a frequency harmonic to the frequency of a fundamental alternating current which consists in subjecting the fundamental alternating current to the effects of an electric current valve of rarefied gas, producing thereby a distortion of the wave form of the fundamental alternating current, and segregating in a suitably tuned electric circuit the resulting alternating current of the desired harmonic frequency.

3. An apparatus for obtaining an alternating current of a frequency harmonic to the frequency of a fundamental alternating current comprising in combination a source of alternating current of the fundamental frequency, an electric circuit connected thereto, a single phase half wave current rectifier included in said circuit for distorting the wave form of the current derived from said source whereby alternating currents of frequencies harmonic to the fundamental frequency are produced, and an auxiliary working circuit connected to said electric circuit and containing means for segregating the resulting alternating current of the desired harmonic frequency.

4. An apparatus for obtaining an alternating current of a frequency harmonic to the frequency of a fundamental alternating current comprising in combination a source of alternating current of the fundamental frequency, an electric circuit operatively related thereto, a uni-directional electric current valve electrically related to said circuit for distorting the wave form of the current derived from said source whereby alternating currents of frequencies harmonic to the fundamental frequency are produced, and an auxiliary electric circuit electrically related to said first mentioned electric circuit and containing means for segregating the resulting alternating current of the desired harmonic frequency.

5. An apparatus for obtaining an alternating current of a frequency harmonic to the frequency of a fundamental alternating current comprising in combination a source of alternating current of the fundamental frequency, an electric circuit connected to said source and including means for distorting the wave form of the current derived from said source by suppressing every other half cycle of the alternating current of fundamental frequency whereby alternating currents of frequencies harmonic to the fundamental frequency are produced, and means for segregating in a suitable tuned electric circuit the resulting alternating current of the desired harmonic frequency.

6. An apparatus for obtaining an alternating current of a frequency harmonic to the frequency of a fundamental alternating current comprising in combination a source of alternating current of the fundamental frequency, an electric circuit connected to said source and including an electric current valve of rarefied gas for distorting the wave form of the current derived from said source whereby alternating currents of frequencies harmonic to the fundamental frequency are produced, and means for segregating in a suitably tuned electric circuit the resulting alternating current of the desired harmonic frequency.

In witness whereof, I have hereunto set my hand this 26th day of July, 1913.

ERNST F. W. ALEXANDERSON.

Witnesses:
BENJAMIN B. HULL,
HELEN ORFORD.